United States Patent [19]
Wood

[11] Patent Number: 5,839,902
[45] Date of Patent: Nov. 24, 1998

[54] ELECTRONIC GEOGRAPHY TEACHING DEVICE

[75] Inventor: Michael C. Wood, Emeryville, Calif.

[73] Assignee: Knowledge Kids Enterprises, Inc., Emeryville, Calif.

[21] Appl. No.: 791,989

[22] Filed: Jan. 31, 1997

[51] Int. Cl.⁶ .................................................... G09B 3/00
[52] U.S. Cl. .......................................... 434/130; 434/322
[58] Field of Search ........................... 434/130, 149–153, 434/322, 323, 317, 335, 364, 362, 308

[56] References Cited

U.S. PATENT DOCUMENTS

| | | | |
|---|---|---|---|
| 3,637,221 | 1/1972 | Geils et al. | 369/233 |
| 4,449,941 | 5/1984 | McGuire et al. | 434/153 |
| 4,978,302 | 12/1990 | Clossey | 434/153 |
| 5,122,062 | 6/1992 | Cutler et al. | 434/327 |
| 5,556,283 | 9/1996 | Stendardo et al. | 434/311 |

*Primary Examiner*—Richard J. Apley
*Assistant Examiner*—Glenn E. Richman
*Attorney, Agent, or Firm*—Jeffer, Mangels, Butler & Marmaro LLP

[57] ABSTRACT

This invention provides for an interactive teaching device. The device comprises a housing depicting a map and has corresponding to various locations on the map. Also provided is a plurality of buttons, a card reader, a processor, and a speaker. Cards are provided with encoded information readable by the device, and depict objects such as animals. In response to insertion of a card or activation of a button thereafter, the device produces a signal that may be a prompt, a statement, or a sound associated with the depicted object. The device allows a user to respond to a prompt by selecting an appropriate button, upon which the device produces a signal validating the user's response.

15 Claims, 4 Drawing Sheets

ELECTRONIC GEOGRAPHY TEACHING DEVICE

FIELD OF THE INVENTION

This invention relates to children's education toys and more particularly, to an interactive teaching device.

BACKGROUND

Children learn names of various objects, facts, and geography by audible repetition accompanied by visualization of the object and map. Often, a parent or teacher will read a book aloud while pointing to the object depicted by the word that is read. In this way, the child visually associates the object with its name. This method of teaching is generally passive, i.e., there may be little interaction between the child and subject matter.

Research has shown, however, that interactive teaching methods using multiple sensory perceptions are more effective than mere memorization. In addition, research has shown that associating ideas and concepts with other ideas and concepts more familiar to the learner significantly enhances the learning process.

Accordingly, there is a need for interactive learning devices that assist the learner by providing concept visualizations and associations. This is particularly the case in "scientific" disciplines such as geography, biology, and botany, where some concepts are easily assimilated by learners (particularly young ones) but others are not.

SUMMARY OF THE INVENTION

Briefly, therefore, this invention provides for a interactive teaching device. The device comprises a housing depicting a map and having selectors associated with various locations on the map. Locations can be selected, typically by pressing them. This causes the device to generate an audio signal or some other response. Typically, the audio signal is in the form of spoken words.

Further, removable media depicting an object associated with at least one location on the map may be used with the device. More selectors are provided for the depicted objects and for ancillary inputs to the device. In response to attachment of the removable media or activation of a selector thereafter, the device produces a signal that may be a prompt, a statement, or a sound associated with the depicted objects. The device allows a user to respond to a prompt by activating an appropriate selector, upon which the device produces a signal depending on the validity of the user's response. The signal is generated by an output in the form of a speaker, and a processor is provided for controlling the operation of the device.

In a further embodiment, the device depicts a flat map with indicia corresponding to various locations, a plurality of buttons, a card reader, and a speaker. Cards are provided with encoded information readable by the device, and depict, for example, animals. In operation, insertion of a card in the card reader causes the device to actuate the speaker to pronounce the name of the depicted animal and the sound that the animal makes. Thereafter, the device requests the user to select a location on the map corresponding to the habitat of the animal.

In response to a selection of a location, the speaker produces an affirmative or negative answer. For example, if the selection is correct, the speaker produces an animal sound followed by articulation of the correct location. If the selection is incorrect, the speaker produces a statement stating the name of the location selected, giving the correct location, and requests the user to select the correct location; e.g. "This is Europe. You are looking for Africa."

Pressing other buttons causes the device to state facts or ask questions about the animal. Alternatively, the user may also respond to questions asked by the device by pressing appropriate buttons.

DETAILED DESCRIPTION OF THE INVENTION

Figure 1:
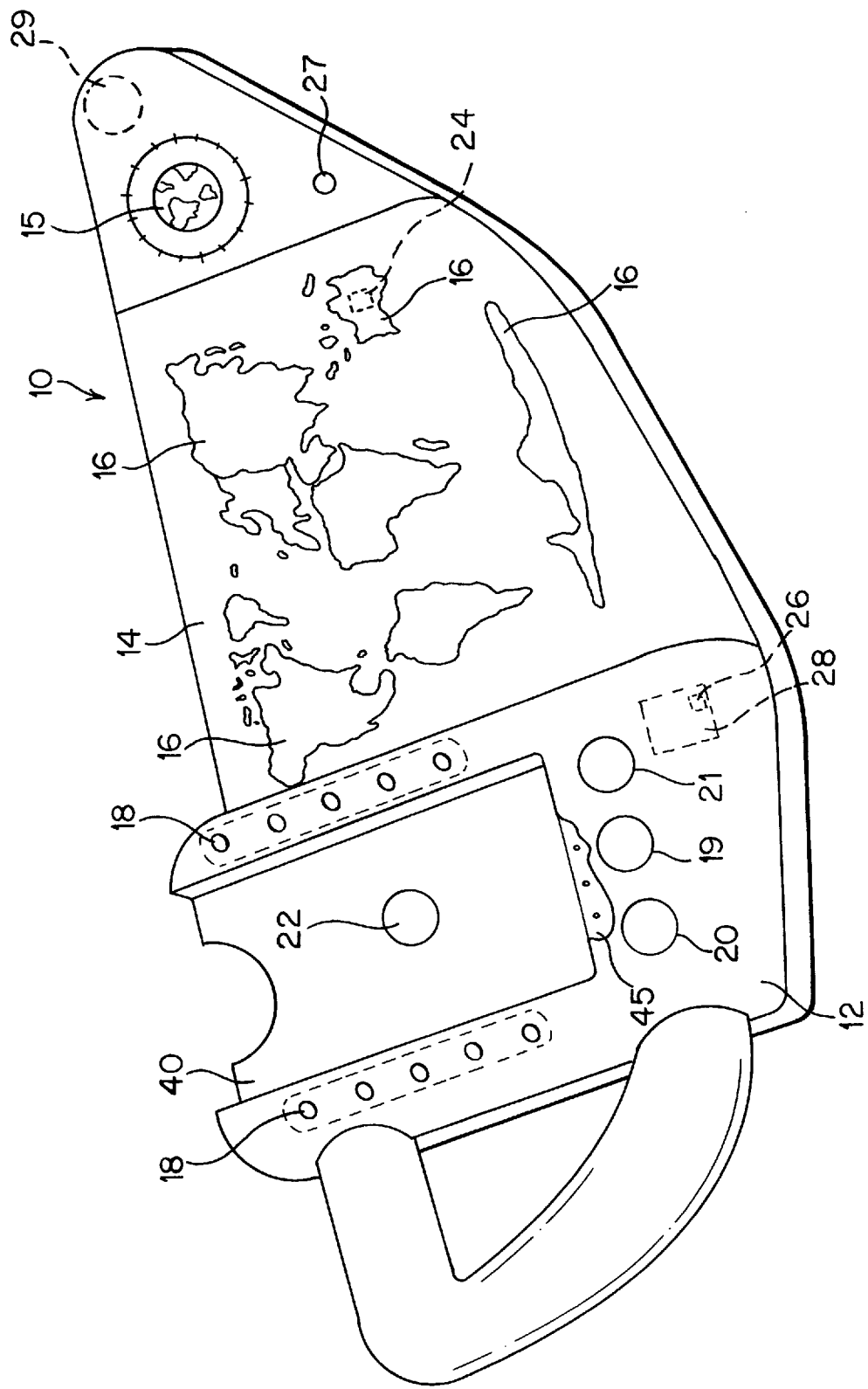
FIG. 1 is a schematic plan view of an electronic interactive teaching device in accordance with the invention.

An electronic interactive teaching device 10 in accordance with the invention is shown in FIG. 1. The device comprises a housing 12 having a substantially planar face that is sized to be hand-held and depicts a map 14 having a plurality of indicia 16 defining different locations on the map 14. In the embodiment shown, the map 14 represents the world, with various continents being represented by indicia 16 sized to be pressed by hand. The indicia 16 have underlying selectors 24 associated with them for indicating selection to a processor 26, and are typically selected by pressing them. Also provided are a card reader 40 and a plurality of buttons 18. The buttons, too, have underlying selectors 24 associated with them and are also typically selected by pressing.

The buttons 18 are placed adjacent to the card reader 40. Some other buttons 19, 20, and 21, are provided and marked with the legend "TRUE", "FALSE", or "QUESTION", and may have distinguishing symbols or colors. For example, the QUESTION button 19 has a question mark on it, while the TRUE button 20 is green and the FALSE button 21 is red. A button 22 is associated with the object depicted on the card 42 and may be placed such that it is directly underneath the depiction of the object when the card 42 is placed in the card reader 40.

Each indicium 16 or button 18 has a selector in the form of a pressure-sensitive switch 24 placed under it. Each pressure-sensitive switch 24 is electrically connected to a processor 26, and activation of a pressure-sensitive switch 24 causes an electrical signal to be sent to the processor 26 indicating selection of the indicium 16 or button 18 corresponding to the pressure-sensitive switch 24.

Other means of sensing selection of an indicium 16 or button 18 may also be used, such as providing the indicia 16 and buttons 18 with touch-sensitive surfaces that send electrical signals to the processor 26 when touched, or optically sensing selection of the indicia and buttons. Such means are well-known in the art. Further description may be seen by reference to U.S. Pat. No. 5,188,533, issued Feb. 23, 1993, and to U.S. Pat. No. 5,511,980, issued Apr. 3, 1996, the disclosures of which are hereby incorporated by reference.

The device illustrated also houses a battery, a speaker 29, and processing circuitry 28 of which processor 26 joins a part. The housing 12 may have a grille (not shown) for allowing sounds from the speaker 29 to be emitted, and an ON/OFF switch 27.

The processing circuitry 28 includes the processor 26, random access memory (RAM), read-only memory, a random number generator, and a voice synthesizer for driving the speaker 29. The read-only memory, which may be provided in the form of a Programmable Read-Only Memory (PROM), contains program instructions for operating the processor 26. The read-only memory further contains data such as names of animals, their habitats, facts about the animals, and the sounds that they make. Other data may also be stored in the read-only memory, such as data relating to countries, their capitals, populations, the continents on which they are located, and dominant geographic features. The voice synthesizer includes a memory for storing data representing spoken words associated with the data in the read-only memory. Other configurations of the processing circuitry 28 are possible, such as providing a separate read-only memory or removable memory for storing the data, or combining the functions of the processor 26 and the voice synthesizer into a single unit. Additionally, the data may be provided in magnetically readable form on the cards inserted into the card reader.

Further included is a small inset globe 15 which corresponds to the map. The globe 15 is able to spin on its axis to teach the user the four main directions and how the map 14 corresponds to the three-dimensional globe 15.

Figure 2:
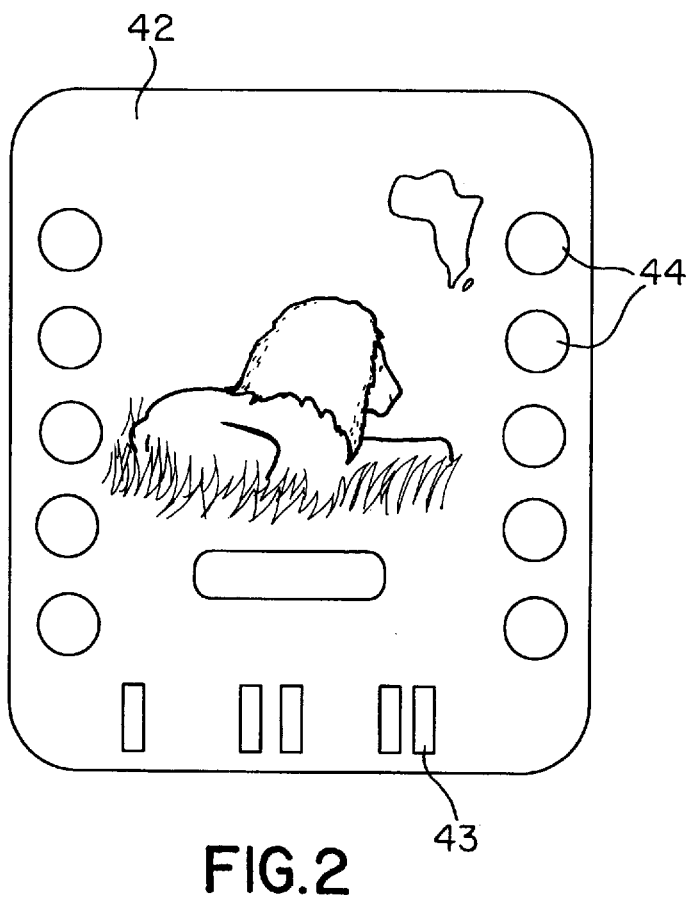
FIG. 2 is a schematic plan view of a removable card for use with the electronic interactive teaching device of the invention.

A plurality of cards are employed with the device 10, such as the card 42 shown in FIG. 2. This card 42 depicts a lion, with the word "LION" underneath the picture. Icons are provided at the edge of the card 42 and correspond to buttons 18 when the card 42 is received in the card reader 40. Other cards may have representations of other animals or other objects such as plants, dinosaurs, and countries, with appropriate labels. The representations shown by the cards and the icons are not limited to those shown in the accompanying drawings.

Each card 42 is uniquely identified by the processing circuitry 28. In one embodiment, each card has on its lower edge a unique signature that identifies the card and its contents. As shown, the signature is a plurality of holes 43 that interface with mating pins 45 in the card reader 40. The presence or absence of a hole 43 encodes information about the identity of the card 42. For example, with eight pins 45, each representing one bit, up to $2^8$ (256) different cards 42 can be uniquely identified in this manner by the processing circuitry 28 inside the device 10. Other means for identifying the card 42 may be used, such as magnetic encoding and bar code readers. Further descriptions of card readers are given in to U.S. Pat. No. 5,511,980.

In operation, the user places a card 42 in the card reader 40. Card 42 is positioned such that holes 43 at the lower edge will be aligned with the pins 45 in the card reader 40. The processor 26 is then able to identify the card 42 and retrieve appropriate information about the card and object depicted on the card from its memory. The processor 26 causes the speaker 29 to produce audio signals associated with the object depicted on card 42, such as an identification of depicted object, and waits for the user to select one of the buttons 18.

If button 22 (which is one of the buttons 18) is selected, the processor 26 causes the speaker 29 to produce an audio signal associated with the card 42, such as a sound made by the object depicted on the card 42. Additionally, the processor 26 causes the speaker 29 to produce a prompting signal, such as a request for the user to select an indicium 16 corresponding to a geographic location associated with the object, and waits for an indicium 16 to be selected. When the user selects an indicium 16, the processor 26 compares the geographic location represented by the indicium 16 to the correct geographic location stored in its memory. If the selected geographic location is correct, the processor 26 causes the speaker 29 to produce a signal representing an affirmative acknowledgement. After the user has correctly identified the geographic location associated with the card 42, the processor 26 waits for a button 18 to be selected. If the selected geographic location is incorrect, the processor 26 causes the speaker 29 to produce a negative acknowledgement, a further prompt, and waits again for another indicium 16 to be selected. When an indicium 16 is reselected, the processor 26 again checks the validity of the associated geographic location and responds as described above.

If a button 18 corresponding to a card icon 44 is selected, the processor 26 will reference data in its memory associated with that icon 44 and cause the speaker 29 to produce an audio signal associated with the referenced data. The processor 26 then waits again for a button 18 to be selected.

If the QUESTION button 21 (which is one of the buttons 18) is selected, the processor 26 uses the random number generator to randomly select data in its memory associated with one of the icons 44 for the card 42 currently in the card reader 40. The processor 26 then causes the speaker 29 to produce an audio signal representing a question or statement associated with the referenced data, and waits for either the TRUE button 20 or the FALSE button 21 to be selected. When the TRUE button 20 or the FALSE button 21 is selected, the processor 26 compares this selection to the correct selection stored in its memory. If the selection is correct, the processor 26 causes the speaker 29 to produce a signal representing an affirmative acknowledgement, and waits again for another button 18 to be selected. If the selection is incorrect, the processor 26 causes the speaker 29 to produce a negative acknowledgement, a further prompt, and waits again for button 20 or 21 to be selected.

Selection of buttons 20 and 21 have no effect unless they are selected in response to a prompt from the processor 26 as described above.

By way of example, the card 42 may depict a lion and have the label "Lion" on it. Several icons 44 are displayed, and at the lower edge of the card 42, holes 43 are coded to indicate to the processor 26 that the card 42 depicts a lion. At the upper right hand corner, an image indicating the lion's habitat is provided. Preferably, this image corresponds to the shape of the indicium 16 (say, the continent of Africa) corresponding to the lion's habitat. When the Lion card 42 is placed in the card reader 40, the device 10 will say "This is the Lion" and make the sound of a roaring lion. The processor 26 then waits for a button 18 to be selected.

If the user presses on the image of the lion, thereby pressing on button 22, the processor 26 causes the speaker 29 to produce a digitized roar of the lion. The processor 26 then causes the speaker 29 to say "The lion lives in Africa. Find the lion's home." When the user selects an indicium 16 in response, the processor 26 compares the selected indicium 16 with the correct indicium 16. In this case, the correct indicium 16 would be the indicium representing Africa. If the selected indicium 16 is correct (i.e. represents Africa), the processor 26 causes the speaker 29 to produce the roar of the lion and say "This is Africa, where the lion lives." The processor then waits again for a button 18 to be selected. If the selection is incorrect, the processor 26 causes the speaker 29 to say "This is [name of incorrect selection]. The lion lives in Africa. Find Africa." The processor 26 then waits for another indicium 16 to be selected, and continues as above.

If the user selects a button 18 corresponding to an icon 44, the processor 26 causes the speaker 29 to state a fact corresponding to the icon 44. Some facts that may be represented by the icons include (a) where the animal lives; (b) what the animal eats; (c) the average number of offspring produced by the animal; (d) how fast the animal is; (e) how large/heavy the animal is; and (f) animal status (endangered, threatened, or extinct?). For example, the lion card 42 might have the following icons: location, diet, speed, and species status. Pressing a button 18 causes the device 10 to recite information associated with the icon 44 corresponding to the button. Such information might be (a) speed—"The lion can run up to 35 mph"; (b) diet—"The lion is a carnivore and eats meat"; (c) location—"The lion lives in Africa"; and (d) "The lion is not endangered".

If the user selects the QUESTION button 21, the processor 26 will use the random number generator to randomly select a fact in its memory associated with one of the icons 44 for the card 42 currently in the card reader 40. The processor 26 then causes the speaker 29 to produce a question or statement about the randomly selected fact, and waits for either the TRUE button 20 or the FALSE button 21 to be selected. For example, the processor 26 might say "The lion lives in Alaska" When the TRUE button 20 or the FALSE button 21 is selected, the processor 26 compares this selection to the correct selection stored in its memory. In this case, the correct selection would be FALSE. If the user has selected FALSE, the device 10 will produce the roar of the lion and a congratulatory remark. If the user selects the TRUE button 20, the device will say "Sorry, that is not correct. Try again." The processor 26 waits again for button 20 or 21 to be selected.

Figure 3:
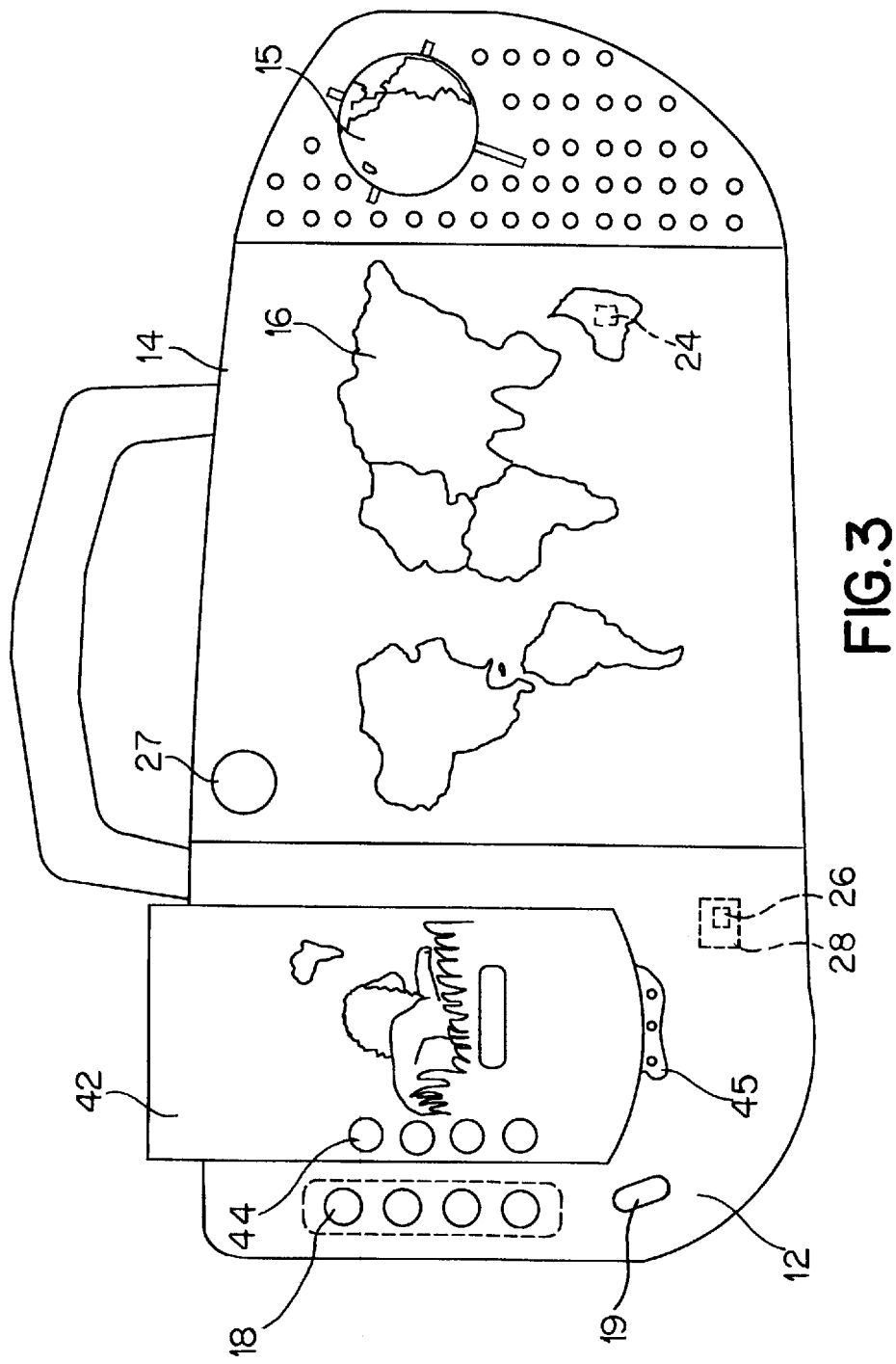
FIG. 3 is a schematic plan view of another embodiment of a electronic interactive teaching device in accordance with the invention.

Another embodiment of the invention is shown in FIG. 3. Similar to the embodiment of FIG. 1, the device of FIG. 3 comprises a housing 12 having a substantially planar face. The housing 12 is sized to be hand-held and depicts a map 14 having a plurality of indicia 16 defining different locations on the map 14. This map 14 is a simplified representation of the world, and has indicia 16 representing various continents. The indicia 16 have underlying selectors 24 associated with them for indicating selection to a processor 26. The device further comprises a card reader 40 and four buttons 18 which also have underlying selectors 24 associated with them.

In this embodiment, the four buttons 18 are placed on the left side of the card reader 40, adjacent to the card 42 when the card 42 is received in the card reader 40. Below the buttons 18 is a QUESTION button 19, which has a question mark on it. A button 22 is associated with the object depicted on the card 42 and may be placed such that it is directly underneath the depiction of the object when the card 42 is placed in the card reader 40.

Each indicium 16 or button 18 has a selector in the form of a pressure-sensitive switch 24 placed under it. Each pressure-sensitive switch 24 is electrically connected to a processor 26, and activation of a pressure-sensitive switch 24 causes an electrical signal to be sent to the processor 26 indicating selection of the indicium 16 or button 18 corresponding to the pressure-sensitive switch 24.

Figure 4:
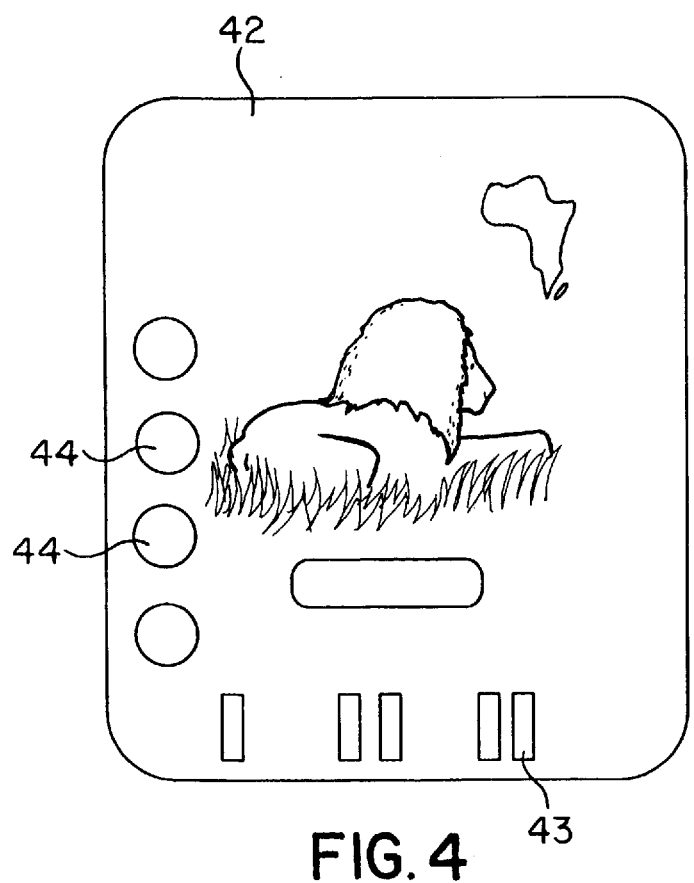
FIG. 4 is a schematic plan view of a removable card for use with the electronic interactive teaching device shown in FIG. 3.

Because of the different number and placement of the buttons 18, the card 42 is reconfigured as shown in FIG. 4 to place the icons 44 so that they correspond to the buttons 18 when the card 42 is received in the card reader 40.

The operation of this embodiment of the device is similar to that of the device shown in FIG. 1, except that TRUE and FALSE buttons 20 and 21 are not available and hence the user does not respond to a question by selection of the TRUE or FALSE buttons 20 and 21. Instead, the user selects the QUESTION button 19, causing the device to ask a question about the animal or other object depicted on the card 40. The user then thinks of the answer and presses one of the buttons 18 corresponding to the subject of the question. This causes the device to state the fact about the animal or object corresponding to the button 18 and the icon 44 associated with the button, and the user compares this answer to the one he/she has in mind.

While the invention has been particularly shown and described with reference to a certain preferred embodiment, it will be understood by those skilled in the art that various alterations and modifications in form and in detail may be made therein. For example, the objects represented may include plants, dinosaurs, cultural or ethnic groups, cities, or landmarks. The unit may also be implemented in another form, such as a "talking book" or as a computer program. Additionally, variations in the modes of operation may be achieved, such as increasing the difficulty of the questions in response to a series of correct answers, or, in a non-prompted mode, reciting multiple facts in response to a single press of a button. Variations of the disclosed processor configuration will be readily apparent to one skilled in the art. Accordingly, it is intended that the following claims cover all such alterations and modifications as may fall within the true spirit and scope of the invention.

What is claimed is:

1. An interactive learning device, comprising:

(a) a map, including a plurality of map locations;

(b) a plurality of indicia, selectable from within the map, respectively corresponding to individual map locations;

(c) an output;

(d) a reader configured to identify a removable medium depicting an entity; and (e) a processing circuit, configured to receive the identity of the medium from the reader, to associate the depicted entity with one of the locations, and in response to a selection of one of the locations, to compare the selected location to the associated location and cause the output to produce an affirmative acknowledgment if the selected location matches the associated location.

2. The device as recited in claim 1, wherein the removable medium is a card.

3. The device as recited in claim 2, wherein the card includes a card-identifying code in the form of holes, and the reader includes pins configured to sense the presence of holes to determine the identifying code of the card.

4. The device as recited in claim 2, further comprising selectors arranged to align with icons on the card when the card is received in the reader.

5. The device as recited in claim 1, wherein the processing circuit includes a processor and a memory configured to store data associated with the medium and the entity depicted by the medium.

6. The device as recited in claim 5, further comprising a plurality of selectors in communication with the processing circuit.

7. The device as recited in claim 6, wherein the processing circuit is further configured to respond to a selection from some of the selectors by retrieving from the memory data associated with the selected selector and the depicted entity, and cause the output to produce a signal representing the retrieved data.

8. The device as recited in claim 7, wherein the retrieved data includes a sound made by the depicted entity.

9. The device as recited in claim 7, wherein the retrieved data includes facts about the depicted entity.

10. The device as recited in claim 7, wherein the processing circuit further comprises a random number generator and is further configured to respond to a selection of one of the selectors by using a randomly generated number to select data associated with one of the selectors and the depicted entity and causing the output to produce a prompting signal based on the selected data.

11. The device as recited in claim 10, wherein the processing circuit is further configured to respond to a selection of a selector corresponding to the selected data by causing the output to produce an acknowledging signal.

12. The device as recited in claim 11, wherein the output is a speaker.

13. The device as recited in claim 12, wherein the processing circuit is further configured to cause the speaker to produce a sound made by the entity.

14. The device as recited in claim 13, wherein the entity is an animal.

15. The device as recited in claim 4, wherein the processing circuit is further configured to respond to a selection of a selector corresponding to the selected data by causing the output to produce an acknowledging signal.

* * * * *